3,088,956
ACYLOXYMETALLOSULFOPHTHALATES

Christian F. Horn, Harry Vineyard, and George W. Fowler, all of South Charleston, W. Va., assignors to Union Carbide Corporation, a corporation of New York
No Drawing. Filed Mar. 20, 1961, Ser. No. 96,672
8 Claims. (Cl. 260—429.9)

This invention relates to new phthalate compounds. More particularly it is concerned with novel acyloxymetallosulfoisophthalates and acyloxymetallosulfoterephthalates.

The novel compounds of this invention are the acyloxymetallosulfophthalates represented by the following general formula:

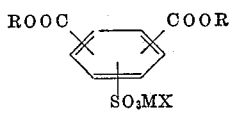

wherein R represents a hydrogen atom or an alkyl radical containing from 1 to about 10 carbon atoms; M represents a divalent metal atom, for example, beryllium, magnesium, calcium, zinc, strontium, barium, or tin; and X represents an acyloxy radical —OOCR', wherein R' represents a monovalent hydrocarbon radical containing from 1 to about 15 carbon atoms, such as an alkyl radical, for example, methyl, ethyl, propyl, isopropyl, butyl, isobutyl, pentyl, hexyl, 2-methylpentyl, 2-ethylbutyl, heptyl, octyl, 2-ethylhexyl, decyl, dodecyl, pentadecyl, and the like, or an aryl radical, for example, phenyl, naphthyl, and the like, or an alkaryl radical, for example, benzyl, phenethyl, and the like, or an aralkyl radical, for example, tolyl, xylyl, and the like.

Of particular interest are the 2-acyloxymetallosulfoterephthalic acid compounds represented by the general formula:

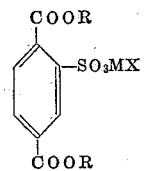

and the 5-acyloxymetallosulfoisophthalic acid compounds represented by the general formula:

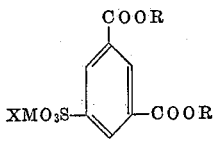

The novel compounds of this invention can be produced by the reaction of a divalent metal salt of a monocarboxylic acid having the general formula $M(OOCR')_2$ with a sulfonated phthalic acid derivative of the formula:

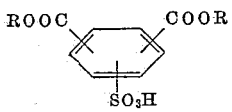

wherein R has the same meanings defined above.

Illustrative of the sulfonated phthalic acid derivatives are the following:

2-sulfoterephthalic acid,
5-sulfoisophthalic acid,
Dimethyl 2-sulfoterephthalate,
Dimethyl 5-sulfoisophthalate,
Diethyl 2-sulfoterephthalate,
Dipropyl 5-sulfoisophthalate,
Diisopropyl 2-sulfoterephthalate,
Dibutyl 2-sulfoterephthalate,
Dihexyl 2-sulfoterephthalate,
Dihexyl 5-sulfoisophthalate,
Dioctyl 2-sulfoterephthalate,
Di-2-ethylhexyl 2-sulfoterephthalate,
Didecyl 2-sulfoterephthalate,
Diisodecyl 2-sulfoterephthalate,
Didecyl 5-sulfoterephthalate, and the like.

The sulfonated isophthalic and terephthalic acid compounds can be produced by known sulfonation procedures. Terephthalic acid and isophthalic acid are known to sulfonate by reaction with concentrated sulfuric acid or oleum to produce the monosulfonic acid derivatives.

The preferred sulfonation procedure is the reaction of the phthalic acid with oleum at a temperature of from about 150° C. to 300° C. for about one to fifteen hours, with reaction conditions between 200° C. to 270° C. for about two to ten hours preferable. The weight ratio of oleum to phthalic acid can vary from about 1 to 1 to about 5 to 1, with weight ratios of from about 2 to 1 to about 3.5 to 1 preferred. Advantageously, a sulfonation catalyst, such as mercury, mercuric sulfate, vanadium pentoxide, and the like, can be used, but its presence is not essential. Further, one can sulfonate either the free phthalic acid or the esters thereof.

The acyloxymetallosulfophthalates of this invention can be produced by heating a mixture of the sulfonated isophthalic or terephthalic acid compound and the divalent salt of a monocarboxylic acid. The reaction is preferably carried out using a large excess of the divalent metal acylate in the presence of a solvent. Suitable solvents are, for example, acetic acid, propionic acid, methanol, ethanol, benzene, toluene, hexane, heptane, cyclohexane, etc.

Preferably the divalent metal acylate is used in excess to ensure complete conversion and to prevent formation of the metal disulfonate salt. However, from about 0.5, or less, to about 10 equivalents, or more, of the divalent metal acylate per equivalent of sulfonic acid radicals present in the sulfonated phthalic acid derivative can be charged. The reaction can be carried out at any convenient temperature, and is preferably conducted at temperatures of from about 50° C. to about 150° C., most preferably at the reflux temperature of the solvent used.

In a typical reaction, a solution of magnesium acetate in methanol is added to a solution of dimethyl 5-sulfoisophthalate in methanol. The methanol is then distilled and replaced by acetic acid whereupon the desired dimethyl 2-acetoxymagnesiumsulfoisophthalate precipitates and is recovered. The substitution of beryllium butyrate for the magnesium acetate results in the production of dimethyl 2-butanoyloxyberylliumsulfoisophthalate.

Among the divalent metal acylates which can be used as starting materials to produce the compounds of this invention one can mention:

| | |
|---|---|
| Beryllium acetate | Calcium formate |
| Beryllium propionate | Calcium isobutyrate |
| Beryllium butyrate | Calcium toluate |
| Beryllium octanoate | Zinc acetate |
| Beryllium benzoate | Zinc benzoate |
| Beryllium toluate | Zinc caproate |
| Magnesium acetate | Zinc nonanoate |
| Magnesium benzoate | Zinc formate |
| Magnesium laurate | Strontium acetate |
| Magnesium salicylate | Strontium pentoate |
| Calcium acetate | Strontium formate |
| Calcium benzoate | Strontium benzoate |
| Calcium butyrate | Strontium toluate |

| | |
|---|---|
| Barium acetate | Stannous propionate |
| Barium benzoate | Stannous butyrate |
| Barium butyrate | Stannous benzoate |
| Barium decanoate | Stannous 2-ethylhexano- |
| Stannous acetate | ate, et cetera. |

These divalent metal acylates when reacted with the sulfonated isophthalic and terephthalic acid compounds produce the acyloxymetallosulfoisophthalates and acyloxymetallosulfoterephthalates of this invention, such as:

2-acetoxyberylliumsulfoterephthalic acid,
2-acetoxymagnesiumsulfoterephthalic acid,
5-acetoxycalciumsulfoisophthalic acid,
2-acetoxyzincsulfoterephthalic acid,
2-acetoxystrontiumsulfoterephthalic acid,
5-acetoxyberylliumsulfoisophthalic acid,
5-acetoxybariumsulfoisophthalic acid,
5-acetoxystannoussulfoisophthalic acid,
2-acetoxybariumsulfoterephthalic acid,
2-acetoxycalciumsulfoterephthalic acid,
2-acetoxystannoussulfoterephthalic acid,
5-acetoxyzincsulfoisophthalic acid,
5-propionoxycalciumsulfoisophthalic acid,
2-propionoxymagnesiumsulfoterephthalic acid,
2-butanoyloxybariumsulfoterephthalic acid,
5-pentanoyloxystannoussulfoisophthalic acid,
2-hexanoyloxycalciumsulfoterephthalic acid,
2-heptanoyloxyzincsulfoterephthalic acid,
5-octanoyloxystannoussulfoisophthalic acid,
2-octanoyloxycalciumsulfoterephthalic acid,
2-decanoyloxybariumsulfoterephthalic acid,
2-dodecanoyloxymagnesiumsulfoterephthalic acid,
2-benzoyloxyzincsulfoterephthalic acid,
2-phenylacetoxystannoussulfoterephthalic acid,
2-toluyloxycalciumsulfoterephthalic acid,
Dimethyl 2-benzoyloxybariumsulfoterephthalate,
Dimethyl 2-acetoxycalciumsulfoterephthalate,
Dimethyl 5-propionoxymagnesiumsulfoisophthalate,
Dimethyl 2-butanoyloxystrontiumsulfoterephthalate,
Dimethyl 5-pentanoyloxyzincsulfoisophthalate,
Dimethyl 5-hexanoyloxystannoussulfoisophthalate,
Dimethyl 2-heptanoyloxyzincsulfoterephthalate,
Dimethyl 2-octanoyloxyberylliumsulfoterephthalate,
Dimethyl 2-decanoyloxyberylliumsulfoterephthalate,
Dimethyl 5-pentadecanoyloxymagnesiumsulfoisophthalate,
Diethyl 5-acetoxyzincsulfoisophthalate,
Diethyl 5-isopropionoxycalciumsulfoisophthalate,
Diethyl 2-butanoyloxystannoussulfoterephthalate,
Diethyl 2-hexanoyloxystrontiumsulfoterephthalate,
Diethyl 5-octanoyloxycalciumsulfoisophthalate,
Diethyl 2-nonanoyloxybariumsulfoterephthalate,
Dipropyl 5-acetoxyzincsulfoisophthalate,
Diisopropyl 2-propionoxystannoussulfoterephthalate,
Dipropyl 2-butanoyloxymagnesiumsulfoterephthalate,
Dipropyl 5-hexanoyloxyzincsulfoisophthalate,
Diisopropyl 5-heptanoyloxycalciumsulfoisophthalate,
Dibutyl 5-acetoxystannoussulfoisophthalate,
Dibutyl 2-isopropionoxyzincsulfoterephthalate,
Dibutyl 5-butanoyloxycalciumsulfoisophthalate,
Dibutyl 2-pentanoyloxybariumsulfoterephthalate,
Dipentyl 5-propionoxymagnesiumsulfoisophthalate,
Dipentyl 2-pentanoyloxymagnesiumsulfoterephthalate,
Dipentyl 2-hexanoyloxycalciumsulfoterephthalate,
Dihexyl 2-acetoxybariumsulfoterephthalate,
Dihexyl 5-propionoxyberylliumsulfoisophthalate,
Dihexyl 5-butanoyloxyzincsulfoisophthalate,
Dihexyl 5-pentanoyloxystannoussulfoisophthalate,
Dipentyl 2-acetoxyzincsulfoterephthalate,
Dipentyl 5-butanoyloxyberylliumsulfoisophthalate,
Dipentyl 2-hexanoyloxystannoussulfoterephthalate,
Dipentyl 2-octanoyloxycalciumsulfoterephthalate,
Dioctyl 5-acetoxybariumsulfoisophthalate,
Dioctyl 5-isopropionoxystannoussulfoisophthalate,
Dioctyl 5-butanoyloxyzincsulfoisophthalate,
Dioctyl 2-pentanoyloxymagnesiumsulfoterephthalate,
Di-2-ethylhexyl 2-acetoxycalciumsulfoterephthalate,
Dioctyl 5-heptanoyloxystrontiumsulfoisophthalate,
Dinonyl 5-acetoxycalciumsulfoisophthalate,
Dinonyl 5-propionoxybariumsulfoisophthalate,
Dinonyl 2-pentanoyloxystannoussulfoterephthalate,
Dinonyl 2-hexanoyloxyzincsulfoterephthalate,
Didecyl 2-acetoxycalciumsulfoterephthalate,
Didecyl 2-propionoxybariumsulfoterephthalate,
Didecyl 5-butanoyloxystannoussulfoisophthalate,
Didecyl 5-heptanoyloxyzincsulfoisophthalate, and the like.

The novel acyloxymetallosulfoisophthalic acid and the acyloxymetallosulfoterephthalic acid compounds of this invention can be used to produce polyesters, polyamides, and other polymers. They are also suitable for use as plasticizers for vinyl and other resins, and as intermediates in the production of insecticides and dyestuffs. They find particular utility in the production of modified linear terephthalate polyester resins. The polyesters produced with the compounds of this invention can be used to produce fibers which are readily dyeable. The dyeings can be carried out by conventional procedures, even without the use of dye assistants or carriers, which have heretofore been necessary with polyesters, to produce deep, bright shades of good wash fastness and light fastness. It was unexpected that the compounds of this invention would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability properties. The polyesters so produced can also be used to produce films and molded articles.

The following examples typically illustrate the production of the compounds of this invention. It is obvious, however, that the invention is not limited by the specific examples.

*Example 1*

A one liter, 3-neck flask was equipped with an air condenser, stirrer, and thermometer, and it was then charged with 332 grams of isophthalic acid, 664 grams of 20 percent oleum, and 8 grams of mercury. The solution was stirred at 200° C. for seven hours, cooled overnight to room temperature, and slowly poured into 250 milliliters of water with agitation. After cooling, the precipitated 5-sulfoisophthalic acid was filtered. The solid acid was dissolved in 500 milliliters of hot water, decolorized with activated carbon black, filtered hot, and the hot filtrate was saturated with gaseous hydrogen chloride. On cooling, the recrystallized 5-sulfoisophthalic acid was filtered and then recrystallized a second time from concentrated aqueous hydrochloric acid. The highly purified acid was dried.

*Example 2*

A two liter, 3-neck flask was equipped with an air condenser, stirrer, and thermometer, and it was then charged with 530 grams of terephthalic acid, 1950 grams of 20 percent oleum, and 14 grams of mercury. The solution was stirred at 255° C. to 260° C. for seven hours, cooled overnight to room temperature, and slowly poured into 700 milliliters of water. After cooling, the precipitated 2-sulfoterephthalic acid was filtered. The solid acid was dissolved in 4 liters of hot water, decolorized with activated carbon black, filtered hot, and the filtrate was saturated with gaseous hydrogen chloride upon which the product precipitated out. The precipitated crystalline 2-sulfoterephthalic acid was filtered. On standing and cooling, an additional quantity of 2-sulfoterephthalic acid was recovered from the filtrate. The crystalline fractions were combined and recrystallized several times from acetic acid and concentrated hydrochloric acid. The dried 2-sulfoterephthalic acid melted at 254° C. to 258° C., and had a neutralization equivalent of 82.6 (calculated 82.06).

Example 3

A five liter, 3-neck flask was equipped with a condenser, stirrer, and thermometer, and it was then charged with 465 grams of 5-sulfoisophthalic acid and 3.5 liters of methanol. The solution was heated at the reflux temperature for seventy-two hours. Thereafter, about 2.5 liters of methanol was distilled from the flask, replaced with fresh methanol, and the mixture was refluxed for an additional six hours. A small portion was removed, the methanol distilled therefrom, and dimethyl 5-sulfoisophthalate was recovered.

In a similar manner, di-n-butyl 5-sulfoisophthalate is produced using n-butanol instead of methanol.

Example 4

A five liter, 3-neck flask was equipped with a condenser, stopper, and thermometer, and it was then charged with 298 grams of 2-sulfoterephthalic acid, and 2.5 liters of methanol. The solution was heated at the reflux temperature for seventy-six hours, during which period the methanol was replaced three times. Finally, the methanol was removed by distillation on a steam bath and dimethyl 2-sulfoterephthalate was obtained as an amber, slightly viscous liquid.

In a similar manner, dibutyl 2-sulfoterephthalate is produced by substitution of butanol for methanol.

Example 5

A solution of 100 grams of magnesium acetate tetrahydrate in 500 milliliters of methanol was placed in a flask equipped with a stirrer and a dropping funnel. Then 200 milliliters of the solution of dimethyl 5-sulfoisophthalate in methanol from Example 3 was added in a dropwise manner with agitation at the reflux temperature of the methanol mixtures. After completion of the addition, most of the methanol was distilled from the flask using a steam bath. To the mixture remaining in the flask about 100 milliliters of acetic acid was added upon which dimethyl 5 - acetoxymagnesiumsulfoisophthalate crystallized out and was recovered by filtration. The filtrate was poured into diethyl ether and a second crop of crystals was obtained. The crystals were combined and recrystallized from a hot mixture of acetic acid and water and then dried. On heating, the dimethyl 5-acetoxymagnesiumsulfoisophthalate was stable to 400° C. *Microanalysis.*—Calculated for $C_{12}H_{19}O_9SMg \cdot 2H_2O$: C, 36.7 percent; H, 4.11 percent. Found: C, 36.72 percent; H, 4.18 percent. Extensive drying at 240° C. and at 2 mm. pressure for three hours gave the anhydrous salt. *Microanalysis.*—Calculated for $C_{12}H_{12}O_9SMg$: C, 40.41 percent; H, 3.39 percent. Found: C, 40.17 percent; H, 3.44 percent.

In a similar manner, dimethyl 5-butanoyloxybariumsulfoisophthalate is produced by the reaction of barium butyrate and dimethyl 5-sulfoisophthalate. Also, di-n-propyl 5-acetoxycalciumsulfoisophthalate is produced by the reaction of calcium acetate and di-2-n-propyl 5-sulfoisophthalate.

Example 6

Dimethyl 5-sulfoisophthalate, 82 grams was dissolved in 300 milliliters of warm methanol. This solution was slowly added at the reflux temperature of the methanol to 600 milliliters of a methanolic zinc acetate solution containing 132 grams of zinc acetate. Thereafter, the methanol was distilled on a steam bath. The reaction product remaining in the flask was dissolved in 750 milliliters of boiling acetic acid and filtered hot to remove the insoluble zinc acetate. On cooling the filtrate, dimethyl 5-acetoxyzincsulfoisophthalate precipitated. It was recrystallized twice again from acetic acid and dried. The purified dimethyl 5-acetoxyzincsulfoisophthalate was stable to 340° C.

Example 7

A solution of 65 grams of 2-sulfoterephthalic acid in 150 milliliters of hot water was added slowly to a hot solution of 100 grams of magnesium acetate tetrahydrate in 150 milliliters of water. After evaporation of the water on a steam bath, the yellow viscous residue was dissolved in 300 milliliters of hot methanol and diluted with 400 milliliters of acetic acid. Methanol was distilled until solid began to precipitate; the mixture was cooled and filtered. The solid impure 2-acetoxymagnesiumsulfoterephthalic acid was recrystallized from methanol. The purified compound became slightly yellow at 330° C. and failed to melt at 400° C. Yield was 77 grams.

Example 8

A hot solution of 55 grams of dimethyl 2-sulfoterephthalate in 150 milliliters of methanol was added slowly to a solution of 64 grams of calcium butyrate dissolved in 350 milliliters of hot methanol. A slight cloudiness appeared in the solution and the solution was diluted with methanol, heated to reflux, treated with activated charcoal and filtered through Hi-flo. The methanol was distilled to 250 milliliters volume; this was poured into 500 milliliters of acetonitrile, and the precipitated solid was filtered. After recrystallization in methanol-acetonitrile, the dimethyl 2-butyryloxycalciumsulfoterephthalate was dried. On heating, a slight tan discoloration occurred at 300° C., but the dimethyl 2-butyryloxycalciumsulfoterephthalate did not melt at 400° C.

Example 9

A solution of 27 grams of dimethyl 5-sulfoisophthalate dissolved in 100 milliliters of hot acetic acid was slowly added with stirring to a boiling solution of 57 grams of barium benzoate in 150 milliliters of acetic acid. After cooling, the impure dimethyl 5-benzoyloxybariumsulfoisophthalate crystallized as a white granular solid and was filtered. The solid was extracted in a soxhlet with acetic acid containing 25 milliliters of water. Upon cooling, the dimethyl 5-benzoyloxybariumsulfoisophthalate crystallized from the solvent to give a white solid that was stable at 400° C., but did not melt. A total of 39 grams of dimethyl 5-benzoyloxybariumsulfoisophthalate was obtained.

Example 10

A solution of 27 grams of dimethyl 5-sulfoisophthalate in 50 milliliters of hot acetic acid was slowly added to 32 grams of strontium acetate dissolved in 100 milliliters of hot acetic acid. Upon cooling, the dimethyl 5-acetoxystrontiumsulfoisophthalate crystallized as a white granular solid. After two recrystallizations from acetic acid, 25 grams of dimethyl 5-acetoxystrontiumsulfoisophthalate was obtained that was stable at 400° C. without melting.

Example 11

A solution of 48 grams of 2-sulfoterephthalic acid in 150 milliliters of 2-methylpentanol was heated for six hours at temperatures up to 140° C. in a 500 milliliter flask equipped with a drying head and thermometer. An azeotrope formed during the heating. After cooling, the solution was diluted with 300 milliliters of methanol and added slowly to a hot solution of 66 grams of zinc acetate in methanol. The solution was evaporated to 150 milliliters, cooled, and the crystallized impure bis (2 - methylpentyl)2 - acetoxyzincsulfoterephthalate was filtered. The bis(2-methylpentyl)2-acetoxyzincsulfoterephthalate was purified with methanol and acetic acid. On heating it became yellow at 365° C. and failed to melt at 400° C.

Example 12

A solution of 5 grams of dimethyl 5-sulfoisophthalate in 100 milliliters of hot acetic acid was added slowly to a boiling solution of 5 grams of stannous acetate in 25 milliliters of acetic acid. After heating at reflux for five minutes, the solution was cooled and 5 grams of dimethyl 5-acetoxystannoussulfoisophthalate crystallized. The acetic acid was evaporated and the total recovered solid was heated at reflux for ten minutes in 250 milliliters of methanol, filtered hot to remove insoluble material, and the methanol was evaporated on a steam bath. White solid dimethyl 5-acetoxystannoussulfoisophthalate was recovered, which weighed 7 grams and melted at 255° C. to 258° C.

What is claimed is:

1. The acyloxymetallosulfophthalic acid compounds represented by the general formula:

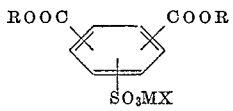

wherein R is a member selected from the group consisting of a hydrogen atom, and an alkyl radical containing from 1 to about 10 carbon atoms; M is a divalent metal atom selected from the group consisting of beryllium, magnesium, calcium, zinc, strontium, barium, and tin; and X is an acyloxy radical of the formula —OOCR', wherein R' is a monovalent hydrocarbyl radical containing from 1 to about 15 carbon atoms.

2. The 2-acyloxymetallosulfoterephthalic acid compounds represented by the general formula:

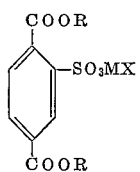

wherein R is a member selected from the group consisting of a hydrogen atom, and an alkyl radical containing from 1 to about 10 carbon atoms; M is a divalent metal atom selected from the group consisting of beryllium, magnesium, calcium, zinc, strontium, barium, and tin; and X is an acyloxy radical of the formula —OOCR', wherein R' is a monovalent hydrocarbyl radical containing from 1 to about 15 carbon atoms.

3. The 5-acyloxymetallosulfoisophthalic acid compounds represented by the general formula:

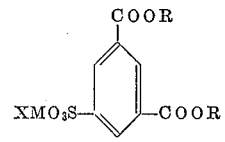

wherein R is a member selected from the group consisting of a hydrogen atom, and an alkyl radical containing from 1 to about 10 carbon atoms; M is a divalent metal atom selected from the group consisting of beryllium, magnesium, calcium, zinc, strontium, barium, and tin; and X is a acyloxy radical of the formula —OOCR', wherein R' is a monovalent hydrocarbyl radical containing from 1 to about 15 carbon atoms.

4. The compound dimethyl 5-acetoxymagnesiumsulfoisophthalate.

5. The compound dimethyl 5-acetoxyzincsulfoisophthalate.

6. The compound dimethyl 5-(benzoyloxybariumsulfo)-isophthalate.

7. The compound dimethyl 2-butyroxycalciumsulfoterephthalate.

8. The compound dimethyl 5-acetoxystrontiumsulfoisophthalate.

References Cited in the file of this patent

UNITED STATES PATENTS

| | | |
|---|---|---|
| 2,794,829 | Van der Waarden et al. | June 4, 1957 |
| 2,895,986 | Burns | July 21, 1959 |

FOREIGN PATENTS

| | | |
|---|---|---|
| 781,905 | Great Britain | Aug. 28, 1957 |